United States Patent [19]

Hamano et al.

[11] Patent Number: 5,380,577
[45] Date of Patent: Jan. 10, 1995

[54] BIAXIALLY ORIENTED POLYETHYLENE-2,6-NAPHTHALENE-DICARBOXYLATE FILM AND PROCESS FOR THE PRODUCTION THEREOF

[75] Inventors: Hisashi Hamano, Sagamihara; Masahiro Hosoi, Tokyo; Ieyasu Kobayashi; Yasuhiro Saeki, both of Sagamihara, all of Japan

[73] Assignee: Teijin Limited, Osaka, Japan

[21] Appl. No.: 258,375

[22] Filed: Jun. 10, 1994

Related U.S. Application Data

[63] Continuation of Ser. No. 976,329, Nov. 13, 1992, abandoned.

[30] Foreign Application Priority Data

Nov. 13, 1991 [JP] Japan .................................. 3-324072

[51] Int. Cl.$^6$ ................................................ B32B 7/04
[52] U.S. Cl. ..................................... 428/143; 528/272; 528/274; 528/275; 528/298; 524/430; 524/444; 524/604; 524/786; 264/176.1; 264/210.7; 428/213; 428/220; 428/364; 428/402
[58] Field of Search ............... 528/272, 274, 275, 298; 524/430, 444, 604, 786; 264/176.1, 210.7; 428/364, 402, 143, 213, 220

[56] References Cited

U.S. PATENT DOCUMENTS

| | | | |
|---|---|---|---|
| 3,875,119 | 4/1975 | Aoki et al. | 528/298 |
| 3,935,166 | 1/1976 | Kanai et al. | 528/190 |
| 3,937,754 | 2/1976 | Shimotsuma et al. | 525/444 |
| 4,461,797 | 7/1984 | Adachi et al. | 428/147 |
| 4,619,869 | 10/1986 | Kiriyama et al. | 428/480 |
| 4,670,319 | 6/1987 | Kotoh et al. | 428/141 |
| 4,677,188 | 6/1987 | Utsumi et al. | 528/272 |
| 4,687,700 | 8/1987 | Hensel et al. | 428/213 |
| 4,761,327 | 8/1988 | Hamano et al. | 428/220 |
| 4,798,759 | 1/1989 | Dallman et al. | 428/220 |
| 4,804,736 | 2/1989 | Utsumi | 528/176 |
| 4,876,137 | 10/1989 | Utsumi | 428/141 |
| 5,023,291 | 6/1991 | Sakamoto et al. | 524/430 |
| 5,051,292 | 9/1991 | Katoh et al. | 428/141 |
| 5,069,962 | 12/1991 | Okazaki et al. | 428/323 |
| 5,182,169 | 1/1993 | Fukuda et al. | 428/343 |

FOREIGN PATENT DOCUMENTS 0229346 7/1987 European Pat. Off. .
2087302 5/1982 United Kingdom .

OTHER PUBLICATIONS

Database WPIL (Abstract), Week 8817, Derwent Publications, Ltd., London, GB AN 88-115339 & JPA-6-3-060 731 (DIAFOIL) Mar. 16, 1988.
Database WPIL (Abstract), Week 8872, Derwent Publications, Ltd., London, GB AN 87-152581 & JPA-6-2-088 136 (TEIJIN) Apr. 22, 1987.

Primary Examiner—Samuel A. Acquah
Attorney, Agent, or Firm—Sherman and Shalloway

[57] ABSTRACT

A biaxially oriented polyester film, (A) which is formed from polyethylene-2,6-naphthalenedicarboxylate containing 0.01 to 1% by weight of inert solid fine particles having an average particle size of 0.05 to 3 μm, (B) which has a refractive index, in a film thickness direction, of at least 1.498, and (C) which has a Young's modulus, at least in one direction, of at least 700 kg/mm$^2$; and a process for the production thereof. This film is useful as a magnetic recording medium, particularly as a base film excellent in abrasion resistance and tear resistance.

16 Claims, No Drawings

BIAXIALLY ORIENTED POLYETHYLENE-2,6-NAPHTHALENE-DICARBOXYLATE FILM AND PROCESS FOR THE PRODUCTION THEREOF

This application is a continuation of application Ser. No. 07/976,329, filed Nov. 13, 1992, now abandoned.

DETAILED DESCRIPTION OF THE INVENTION

The present invention relates to a biaxially oriented polyethylene-2,6-naphthalenedicarboxylate film and a process for the production thereof. More specifically, it relates to a biaxially oriented polyethylene-2,6-naphthalenedicarboxylate film useful as a magnetic recording medium, particularly as a base film excellent In abrasion resistance and tear resistance; and a process for the production thereof.

A polyethylene terephthalate film is widely used as a base film for magnetic tapes. In recent years, magnetic tapes are being increasingly required to enable high-density recording for downsizing of their own and for achieving high-quality sound and images. Further, It is also required to decrease the thickness of magnetic tapes, as is typically required of 8 -mm video tapes. For these reasons, the magnetic layer-side surface of a magnetic tape is required to be smoothest possible, and the thickness of a magnetic tape is required to be smallest possible. Due to this, a base film is also required to be flatter on the surface and smaller in the thickness. For high-density recording. It is required to extremely decrease the surface roughness. However, when the surface roughness is decreased, the lubricity between film surfaces deteriorates. Further, air entrapped between film surfaces is hardly or poorly released, which makes It very difficult to take lip the film on a roll. This difficulty Increases as the film thickness decreases. Moreover, as the film thickness decrease, the film is required to have a higher Young's modulus. On the other hand, generally, the higher the Young's modulus is, the larger the heat shrinkage of a film is, and the dimensional stability of a magnetic tape formed from such film deteriorates. Furthermore, the so-obtained magnetic tape shows an extreme surface roughness printing phenomenon (in which a finished magnetic surface is roughened since the finished magnetic surface and a base film surface are tightly contacted to each other in the heat treatment step for thermosetting the magnetic tape by heating a roll of the magnetic tape), and the electromagnetic conversion characteristic are deteriorated. Further, as the stretch ratio in one direction is increased for decreasing the film thickness and increasing the Young's modulus, the tear resistance in said direction decreases. As a result, the film under treating step of the film-formation or even the film as a finished product of a magnetic tape is liable to cause a vital trouble that the film or the magnetic tape is cut into two due to a scratch on its edge side. Further, due to the increased stretch ratio, voids are liable to be formed near the fine particles, which ends up in poor abrasion resistance.

It is an object of the present invention to provide a biaxially oriented polyethylene-2,6-naphthalenedicarboxylate film having excellent properties.

It is another object of the present invention to provide a biaxially oriented polyethylene-2,6-naphthalenedicarboxylate film having excellent electromagnetic conversion characteristic as a base film of a thin long-time-recording magnetic tape, having high strength against cutting in a step of coating with a magnetic coating composition or used as a magnetic tape and having high resistance to abrasion when treated with a roll system for calender treatment.

It is further another object of the present invention to provide a process for producing the biaxially oriented polyethylene-2,6-naphthalenedicarboxylate of the present invention.

Other objects and advantages of the present invention will be apparent from the following description.

According to the present invention, the above objects and advantages are achieved, first, by a biaxially oriented polyester film, (A) which is formed from polyethylene-2,6-naphthalenedicarboxylate containing 0.01 to 1% by weight of inert solid fine particles having an average particle size of 0.05 to 3 $\mu$m, (B) which has a refractive index, in a film thickness direction, of at least 1.498, and (C) which has a Young's modulus, at least in one direction, of at least 700 kg/mm$^2$.

In the present invention, the polyethylene-2,6-naphthalenedicarboxylate constituting the film is a polymer having naphthalenedicarboxylic acid as a main acid component (preferably at least 80 mol %, more preferably 90 mol % based on the amount of the entire dicarboxylic acid) and ethylene glycol as a main glycol component (preferably at least 80 mol %, more preferably 90 mol % based on the amount of the entire diol component). In addition to these main components, a small amount of other dicarboxylic acid component and a small amount of other glycol component may be incorporated.

The above "other dicarboxylic acid component" includes aromatic dicarboxylic acids such as terephthalic acid, isophthalic acid, diphenylsulphonedicarboxylic acid and benzophenonedicarboxylic acid; aliphatic dicarboxylic acids such as succinic acid, adipic acid, sebacic acid and dodecanedicarboxylic acid; and alicyclic dicarboxylic acids such as hexahydroterephthalic acid and 1,3-adamantanedicarboxylic acid.

The above "other glycol component" includes 1,3-propanediol, 1,4-butanediol, 1,6-hexanediol, neopentyl glycol, 1,4-cyclohexanedimethanol and p-xylylene glycol. The above polymer may also contain additives such as a stabilizer and a colorant.

The polyethylene-2,6-naphthalenedicarboxylate can be generally prepared by such a known method as a melt-polymerization method, and in this preparation, additives such as catalyst mat be optionally used as required.

The polyethylene-2,6-naphthalenedicarboxylate preferably has an intrinsic viscosity in the range of 0.45 to 0.90.

The material for the inert solid particles preferably Includes (1) silicon dioxide (including hydrate, diatomaceous earth, silica sand and quartz), (2) alumina, (3) silicates containing at least 30% by weight of SiO$_2$ [e.g., amorphous or crystalline clay mineral and aluminosilicate (including a calcined material and hydrate), chrysotile, zircon and fly ash]; (4) oxides of Mg, Zn, Zr and Ti; (5) sulfates of Ca and Ba; (6) phosphates of Li, Na and Ca (including monohydrates and dihydrates); (7) benzoates of Li, Na and K; (8) terephthalates or Ca, Ba, Zn and Mn; (9) titanates of Mg, Ca, Ba, Zn, Cd, Pb, Sr, Mn, Fe, Co and Ni; (10) chromates of Ba and Pb; (11)

carbon (e.g., carbon black and graphite); (12) glass (e.g., powdered glass and glass beads); (13) carbonates of Ca and Mg; (14) fluorite; and (15) ZnS. More preferred are silicon dioxide, silicic acid anhydride, hydrous silicic acid, alumina, aluminum silicate (Intruding calcined material and hydrates), monolithium phosphate, trilithium phosphate, sodium phosphate, calcium phosphate, barium sulfate, titanium oxide, lithium benzoate, double salts of these compounds (including hydrates), powdered glass, clay (including kaolin, bentonite and china clay), talc, diatomaceous earth and calcium carbonate. Particularly preferred are monodisperse silica, titanium oxide, alumina and calcium carbonate.

In the present invention, the above inert solid fine particles have an average particle size of 0.05 to 3 μm, and the content thereof is 0.01 to 1% by weight. The inert solid fine particles may be used alone or in combination in kind. When the inert solid fine particles are used in combination in kind, at least two kinds of the inert solid fine particles may be used. Further, regardless of difference or sameness in kind, it is possible and preferred to use a group of particles whose average particle size is relatively larger (larger-size particles) and a group of particles whose average particle size is relatively smaller (smaller-size particles) in combination. The average particle size of the smaller-size particles is preferably 0.01 to 3 μm, more preferably 0.05 to 3 μm. The content of the smaller-size particles is preferably 0.01 to 1% by weight, more preferably 0.05 to 0.5% by weight, particularly preferably 0.1 to 0.3% by weight. The average particle size of the larger-size particles is preferably 0.3 to 3.0 μm, more preferably 0.5 to 1.5 μm. The content of the larger-size particles is preferably 0.01 to 0.10% by weight, more preferably 0.01 to 0.05% by weight. In view of electromagnetic conversion characteristic, it is preferred to incorporate the larger-size particles ill a small amount. If, however, no larger-size particles are incorporated, it is difficult to wind up the film. It is therefore preferred to incorporate a very small amount of the larger-size particles to improve the winding-up properties. When the content of the larger-size particles is more than 0.10% by weight, undesirably, the tape shows poor electromagnetic conversion characteristic. On the other hand, when the content of the smaller-size particles is less than 0.01% by weight, it is difficult to wind up the film even :in incorporation of the larger-size particles, while when it is more than 1% by weight, undesirably, the tape shows poor electromagnetic conversion characteristic. When the larger-size particles and the smaller-size particles are used in combination, the difference in average particle size between these two groups of the particles is preferably at least 0.3 μm, more preferably at least 0.4 μm. When the above difference In average particle size is less than 0.3 μm, air release is poor when the film is wound up, and the film also shows poor running properties. It greatly tends to be difficult to satisfy the winding-up properties and the electromagnetic conversion characteristic at the same time.

Being attributable to polyethylene-2,6-naphthalenedicarboxylate containing the above inert solid fine particles, the polyethylene-2,6-naphthalenedicarboxylate film of the present Invention preferably has a surface roughness, Ra, of 0.005 to 0.030 μm. When Ra is larger than 0.030 μm, it is difficult to maintain the electromagnetic conversion characteristic required of a high-density recording magnetic tape. When Ra is smaller than 0.005 μm, the friction coefficient increases to make it very difficult to handle the film and take it up In a roll form.

The biaxially oriented polyester film of the present invention has a refractive index, $n_z$, in the film thickness direction, of at least 1.498.

The polYethYtene-2,6-naphthalenedicarboxylate is stiffer than a conventional polyethylene terephthalate film, and therefore, It can be obtained as a film having a small thickness but sufficient tenacity by increasing the stretch ratio thereof. On the other hand, with an increase in the stretch ratio, the degree of the molecular orientation of the film increases, and the tear resistance in the stretch direction tends to decrease. The orientation degree can be expressed in terms of a refractive index, $n_z$, in the thickness direction as an index for the orientation. The film of the present invention Is an oriented film those refractive index in the film thickness direction is preferably at least 1.498, more preferably at least 1.500. When this condition is satisfied, there can be obtained a film having higher tear resistance, containing a decreased amount of voids around the fine particles and having improved abrasion resistance.

The biaxially oriented polyester film from the present invention further has a Young's modulus, at least in one direction, of at least 700 kg/mm$^2$.

The biaxially oriented film being formed of polyethylene-2,6-naphthalenedicarboxylate as a raw material and having a refractive index, in the film thickness direction, of at least 1.498 and a Young's modulus, at least in one direction, of at least 700 kg/mm$^2$ is novel.

The Young's modulus of the biaxially oriented polyester film of the present invention at least in one direction is preferably at least 800 kg/mm$^2$, more preferably at least 850 kg/mm$^2$.

The Young's modulus of the above biaxially oriented polyester film in the direction at right angles with the above direction is preferably at least 500 kg/mm$^2$, more preferably at least 550 kg/mm$^2$.

Although not specially limited, the thickness of the polyethylene-2,6-naphthalenedicarboxylate film of the present invention is preferably 75 μm or less preferably, in the range of 2.5 to 25 μm, more preferably not more than 15 μm, particularly preferably 5 to 12 μm.

Further, in the biaxially oriented polyester film of the invention, the heat shrinkage in the longitudinal direction in heat treatment at 70° C. under no load for 1 hour is preferably not more than 0.08% The heat shrinkage is more preferably not more than 0.04%. When the heat shrinkage is more than 0.08%, a tape produced from a film having such a heat shrinkage causes a thermal irreversible change, and the tape also shows skew distortion when there is difference between a videotape-recording temperature and a videotape-reproducing temperature. When the heat shrinkage is too large, the base film has a surface roughness printing effect on a magnetic surface, and the magnetic surface is therefore roughened. The heat shrinkage in heat treatment at 70° C. for 1 hour is generally decreased by increasing the temperature for heat treatment of a stretched film. When the temperature for heat treatment is too high, the mechanical properties deteriorate, and the film is greatly scratched in a step of processing It Into a magnetic tape. Further, dust produced by scratching adheres to the magnetic surface of the magnetic tape to cause a drop out. To avoid this problem, It is preferred to subject the film to relaxing treatment in which the film is passed through a nip formed by two rolls having different rotation rates at a temperature equivalent to, or higher, than the glass transition temperature (Tg) of polyethylene-2,6-naphthalenedicarboxylate, although the means of decreasing the heat shrinkage shall not be limited to this.

According to the present invention, a biaxially oriented polyester film having a high refractive index and a high Young's modulus can be produced by a process which comprises, (1) preparing a substantially amorphous unstretched film of polyethylene-2,6-naphthalenedicarboxylate containing 0.01 to 1% by weight of Inert solid fine particles having an average particle size of 0.05 to 3 μm, (2) simultaneously or consecutively biaxially stretching the unstretched film In one direction and in a direction at right angles with said one direction at a temperature higher than a glass transition temperature of the polyethylene-2,6-naphthalenedicarboxylate by at least 10° C. at an area stretch ratio of at least 15 to obtain a stretched film, and (3) heat-treating the stretched film under tension at a temperature of 200° C. or higher.

The inert solid fine particles and the polyethylene-2,6-naphthalenedicarboxylate both described in step (1) have been already discussed. The substantially amorphous unstretched film formed from polyethylene-2,6-naphthalenedicarboxylate containing the inert solid fine particles as a raw material can be prepared, for example, by extruding the molten raw material through a slit onto a rotating cooling drum to air-cool it.

In step (2), the above unstretched film is stretched at a temperature higher than the glass transition temperature off polyethylene-2,6-naphthalenedicarboxylate by at least 10° C., preferably at a temperature between a temperature higher than the said glass transition temperature by 10° C. and a temperature higher than the said glass transition temperature by 30° C. For example, a polyethylene-2,6-naphthalenedicarboxylate homopolymer has a glass transition temperature of 113° C., and hence, the stretching temperature is preferably between 125° C. and 140° C.

The unstretched film is stretched, for example, by a series of rolls or a tenter in one direction and in a direction at right angles with said one direction, for example, by a method in which it is consecutively stretched, first in the longitudinal direction and then in the traverse direction, or by a method in which it is stretched in the longitudinal direction and in the traverse direction simultaneously. In consecutive stretching, the unstretched film may be stretched a plurality of times in each direction.

The area stretch ratio is at least 15, preferably 20 to 30.

Then, in step (3), the stretched film is heat-treated tinder tension. The temperature for the heat treatment is 200° C. or higher, preferably between 210° C. and 250° C., more preferably between 220° C. and 240° C. The time for the heat treatment is preferably approximately 0.9 to 1.5 seconds.

According to the present invention, the substantially amorphous unstretched film prepared in step (1) is stretched at a relatively high temperature at a high stretch ratio in step (2) to be converted to a stretched film having a high Young's modulus. It cannot be denied that the Young's modulus decreases to some extent in step (3), whereas the heat-treatment for relaxation gives a biaxially oriented polyester film having improved tear resistance as the biaxially oriented polyester film of the present invention.

As described above, the biaxially oriented polyethylene-2,6-naphthalenedicarboxylate film of the present invention has a decreased amount of voids, which contributes to achieve high strength against abrasion, and has improved tear resistance. For example, the trouble is reduced at a step for producing a magnetic tape, and the magnetic tape is consequently more efficiently produced. Further, since it has excellent heat stability, a skew strain decreases. Therefore, it is useful as a base film for a magnetic recording medium, further as a base film for a thin long-time-recording magnetic recording medium, particularly as a base film for a magnetic tape.

The present invention will be further explained hereinafter by reference to Examples.

The physical properties and characteristics In the present invention were measured and/or are defined as follow.

(1) Young's modulus

A film was cut to prepare a sample having a width of 10 mm and a length of 150 mm, and the sample was pulled with an Instron type universal tensile tester at a distance of 100 mm between chucks, at a pulling rate of 10 mm/minute and at a charting rate of 500 mm/minute. The Young's modulus was calculated on the basis of a tangent in a rising portion of the resultant load-elongation curve.

(2) Surface roughness (Ra) of film

A chart (film surface roughness curve) was prepared with a needle-contacting type surface roughness tester (Surfcoder 30C, supplied by Kosaka Laboratories Ltd.) with a needle radius of 2 μm under a needle pressure of 30 mg. A portion having a measured length L in the direction of its center line was picked up from the film surface roughness curve. The center line of this portion picked up was taken as an X axis, the direction of the length multiplication was taken as a Y axis, and the roughness curve was expressed as Y=f(x). The value (Ra: μm) given by the following equation was defined as a film surface roughness.

$$Ra = \frac{1}{L} \int_0^L |f(x)| dx$$

In the present invention, a sample film was measured for a surface roughness five times with the measurement length being 1.25 mm and a cut-off value being 0.08 mm, and an average of the five measurement values was taken as Ra.

(3) Heat shrinkage

A film having a length of about 30 cm and a width of 1 cm, which had been accurately measured for its length in advance, was placed in an oven at 70° C. under no load, and heat-treated for 1 hour. Then, the film was taken out of the oven, and allowed to stand until it had a room temperature, and measured for a length to determine a change in the length. The heat shrinkage was determined by the following equation, $$\text{Heat shrinkage factor (\%)} = \frac{\Delta L}{L_0} \times 100$$

in which $L_0$ is the length before the heat treatment and $\Delta L$ is a dimensional change amount between the lengths before and after heat treatment.

(4) Size of particles

There are two following cases when measured for their particle sizes.

1) Case where fine particles are measured for an average particle diameter aspect ratio, etc.:
2) Case where fine particles in a film are measured for an average particle diameter, aspect ratio, etc.:

1) Case of fine powders:

Fine powders were placed so scatteringly on a sample stage of an electron microscope that overlapping of the powder particles was avoided as much as possible. A thin gold vapor-deposited film having a thickness of 200 to 300 angstroms was formed on each particle surface with a gold-sputtering apparatus. The powder particles were observed with a scanning electron microscope at magnification of 10,000 to 30,000 diameters, and at least 100 particles were measured for a maximum diameter (Dli), a minimum diameter (Dsi) and a diameter, as the diameter of a circle converted from an area, (Di) each with Luzex 500, supplied by Nihon Regulator Co., Ltd. And, the number average values of these, expressed by the following equations, were taken as the maximum diameter (Dl), minimum diameter (DS) and average particle diameter (DA) of the spherical fine particles.

$$Dl = \left( \sum_{i=1}^{n} Dli \right) / n$$

$$DS = \left( \sum_{i=1}^{n} Dsi \right) / n$$

$$DA = \left( \sum_{i=1}^{n} Di \right) / n$$

(2) Case of spherical fine particles in a film

A small strip of a sample film was fixed on a sample stage of a scanning electron microscope, and the S sample surface was ion-etched with a sputtering apparatus (JFC-1100 ion-sputtering apparatus) supplied by Nippon Denshi K.K. Under the following conditions. The sample was placed in a bell Jar, and the vacuum degree was increased up to a vacuum state of about $10^{-3}$ Torr. The ion etching was carried out at a voltage of 0.25 KV and a current of 12.5 mA for about 10 minutes. Further, gold was sputtered on the film surface with said apparatus, and the film surface was observed with a scanning electron microscope at magnification of 10,000 to 30,000 diameters to determine a maximum diameter (Dli), a minimum diameter (Dsi) and a diameter, as the diameter of a circle converted from an area, (Di) of each of at least 100particles with Luzex 500 supplied by Nihon Regulator Co., Ltd. Thereafter, the procedures of the above 1) were repeated.

(5) Void

A film surface was ion-etched to expose fine particles in the film and the etched surface was uniformly vacuum-deposited with aluminum in a thickness of 400 to 500 angstroms or less. The surface was observed through a usual scanning electron microscope at a magnification of 3,500 to 5,000 diameters to measure the fine particles for a length and voids for a length, and a void length/fine particle length ratio was taken as a void ratio in the ion-etching, the film surface was ion-etched, For example, with a JFC-1100 ion-sputtering apparatus supplied by Nippon Denshi K.K. at 500 V at 12.5 mA for 15 minutes. The degree of vacuum was about $10^{-3}$ Tort.

(6) Haze

The haze of a sample film was determined according to JIS-K 674 with an integrating sphere type HTR meter supplied by Nippon Seimitsu Kogakusha.

(7) Evaluation of abrasion in calendering

The abrasion of a running surface of a film was evaluated with a give-roll minisuper calender. The film was allowed to run through the five-roll calender consisting of nylon rolls and steel rolls at a treatment temperature of 80° C. under a linear film contact pressure of 200 kg/cm at a film speed of 50 m/minute. The abrasion of the running film was evaluated on the basis of the degree of dirt adhering to the top roll of the calender when the film had run in the total distance of 2,000 m.
ⓞ: no dirt on nylon roll
◯: almost no dirt on nylon roll
X: dirt on nylon roll
XX: heavy dirt on nylon roll

(8) Refractive index

A sample film was measured for a refractive index with an Abbe refractometer with sodium D ray (589 nm) as a light source. A solution of sulfur in methylene iodide was used as a mounting liquid, and the measurement was carried out at 25° C. at 65% RH.

(9) Tear resistance

A sample film was measured for tear resistance in the film length direction (longitudinal direction) and film width direction (traverse direction) according to JIS-P 8116.

(10) Film Intrinsic viscosity 0.300 Gram of a sample was added to 25 ml of o-chlorophenol (OCP) and dissolved therein under heat at 150° C. for 30 minutes. The resultant solution was measured for an intrinsic viscosity with a viscosity tube in a temperature controlled bath kept at 25° C.±0.1° C.

EXAMPLE 1 AND COMPARATIVE EXAMPLE 1

Polyethylene-2,6-naphthalenedicarboxylate containing 0.15% by weight of silica particles having an average particle size of 0.3 μm and having an intrinsic viscosity off 0.62 dl/g was dried at 170° C. for 6 hours, melt-extruded at 305° C., and rapidly cooled on a casting drum maintained at 60° C. to give an unstretched film having a thickness of 110 μm.

While the above-obtained unstretched film was exposed to 5 kw IR heaters (160 V) placed above and below the film at a distance of 20 mm from the film surfaces, it was stretched at a stretch ratio of 5.6 in the longitudinal direction between two rolls having different velocities, the low-velocity roll having a surface temperature of 125° C. Further, the stretched film was stretched at a stretch ratio of 3.8 in the traverse direction at 135° C. with a tenter, and then thermoset at 215° C. for 3 seconds. The resultant biaxially oriented film had a thickness of 10 μm and a refractive index, $n_z$, In the thickness direction, of 1.487. This film showed poor abrasion resistance and low tear resistance (Comparative Example 1). Table 1 shows the properties of this film.

The above procedures were repeated except that the thermosetting temperature was increased to 245° C. (Example 1). The resultant biaxially oriented film had a refractive index, $n_z$, In the thickness direction, of 1.504. This film had a high Young's modulus, but showed excellent abrasion resistance and excellent tear resistance. Table 1 shows the properties of this film.

EXAMPLE 2

Example 1 was repeated except that the stretch ratios In the longitudinal and traverse directions were set at 6.2 and 5.1 and that the thermosetting temperature was set at 240° C. Table 1 shows the results.

EXAMPLE 3

Example 1 was repeated except that the stretch ratios in the longitudinal and traverse directions were set at 4.9 and 5.3 and that the thermosetting temperature was set at 240° C. Table 1 shows the results.

Table 1 shows that Examples 1, 2 and 3 had an effect on a sufficient decrease in the heat shrinkage at 70° C. for 1 hour even if these films were not particularly subjected to relaxation treatment in the longitudinal direction.

TABLE 1

|  |  | Unit | Ex. 1 | Comp. Ex. 1 | Ex. 2 | Ex. 3 |
|---|---|---|---|---|---|---|
| Amount | Kind |  | $SiO_2$ | $SiO_2$ | $SiO_2$ | $SiO_2$ |
|  | Average particle size | μm | 0.3 | 0.3 | 0.3 | 0.3 |
|  | Amount | wt % | 0.15 | 0.15 | 0.15 | 0.15 |
| Film forming conditions | Stretching |  | twice | twice | twice | twice |
|  | Stretch ratio MDR × TDR |  | 5.6 × 3.8 | 5.6 × 3.8 | 6.2 × 5.1 | 4.9 × 5.3 |
|  | Temperature for stretching in longitudinal direction | °C. | 125 | 125 | 125 | 125 |
|  | IR heater | V | 160 | 160 | 160 | 160 |
|  | Thermosetting temperature (MAX) | °C. | 245 | 215 | 240 | 240 |
| Film properties | Thickness | μm | 10 | 10 | 7 | 10 |
|  | Density | g/cm³ | 1.359 | 1.351 | 1.357 | 1.358 |
|  | Refractive index $n_z$ |  | 1.504 | 1.487 | 1.500 | 1.502 |
|  | Young's modulus |  |  |  |  |  |
|  | MD | kg/mm² | 970 | 1,020 | 890 | 710 |
|  | TD | kg/mm² | 570 | 540 | 640 | 740 |
|  | Internal haze | %/μ | 0.4 | 0.66 | 0.4 | 0.4 |
|  | Light load tear strength |  |  |  |  |  |
|  | MD | kg/mm | 0.15 | 0.10 | 0.2 | 0.2 |
|  | TD | kg/mm | 0.3 | 0.20 | 0.3 | 0.2 |
|  | Heat shrinkage 70° C. × 1 hr. |  |  |  |  |  |
|  | MD | % | 0.040 | 0.06 | 0.045 | 0.015 |
|  | TD | % | 0.005 | 0.02 | 0.006 | 0.018 |
|  | Surface roughness | nm | 7 | 7 | 7 | 8 |
| Evaluation | Abrasion in calendering |  | ⊚ | XX | X~O | O |
|  | Overall evaluation |  | ⊚ | Δ~X | O | O |

It is a film having a high Young's modulus, high tear strength and low abrasion in calendering that is suitable as a base film for a magnetic tape. The voids on the surface of such a film are small. Therefore, the film has low haze, undergoes less heat shrinkage, and is thermally stable.

The films obtained in Examples were totally evaluated on the basis of the following ratings by considering the above properties.

⊚: Excellent as a tape base
O: Good for use in some fields
Δ~X : Insufficient In a plurality of items of properties, i.e., poor as a tape base.

What is claimed is:

1. A biaxially oriented polyester film,
   (A) which is formed from polyethylene-2,6-naphthalenedicarboxylate containing 0.01 to 1% by weight of inert solid fine particles having an average particle size of 0.05 to 3 μm,
   (B) which has a refractive index, in a film thickness direction, of at least 1.500, and
   (C) which has a Young's modulus, at least in one direction, of at least 700 kg/mm².

2. The biaxially oriented polyester film of claim 1, wherein the polyethylene-2,6-naphthalenedicarboxylate has an intrinsic viscosity in the range of 0.45 to 0.90.

3. The biaxially oriented polyester film of claim 1, wherein the inert solid fine particles consist of a group of particles whose average particle size is relatively larger and a group of particles whose average particle size is relatively smaller, and the difference in average particle size between these two groups of the particles is at least 0.3 μm.

4. The biaxially oriented polyester film of claim 1, wherein the Young's modulus at least in one direction is at least 800 kg/mm².

5. The biaxially oriented polyester film of claim 1, wherein the film has a surface roughness in the range of 0.005 to 0.030 μm.

6. The biaxially oriented polyester film of claim 1, wherein the film has a thickness in the range of 2.5 to 25 μm.

7. The biaxially oriented polyester film of claim 3, wherein the average size of the group of the smaller size particles ranges from 0.01 to 3 μm and comprises from 0.01 to 1% by weight of the film.

8. The biaxially oriented polyester film of claim 3, wherein the average size of the group of the larger size particles ranges from 0.3 to 3 $\mu$m and comprises from 0.01 to 0.10% by weight of the film.

9. The biaxially oriented polyester film of claim 8 wherein the average size of the group of the smaller size particles range from 0.01 to 3 $\mu$m and the group of the smaller size particles comprise from 0.01 to 1% by weight of the film and is greater than the amount of the group of the larger size particles and wherein the difference in the average particle size between these two groups is at least 0.04 $\mu$m.

10. The biaxially oriented polyester film of claim 1, wherein the Young's modulus in the direction at right angles to the direction having a Young's modulus of at least 700 kg/mm$^2$ is at least 500 kg/mm$^2$.

11. The biaxially oriented polyester film of claim 1, wherein heat shrinkage in the longitudinal direction during heat treatment at 70° C. at no load for one hour is no greater than 0.08%.

12. The biaxially oriented polyester film of claim 1 having a thickness of from 5 to 12 $\mu$m.

13. The biaxially oriented film of claim 1 having a refractive index, in the film thickness direction of from 1.500 to 1.504.

14. A biaxially oriented polyester film,
(A) which is formed from polyethylene-2,6-naphthalenedicarboxylate containing 0.01 to 1% by weight of inert solid fine particles having an average particle size of 0.05 to 3 $\mu$m,
(B) which has a refractive index, in a film thickness direction, of at least 1.500,
(C) which has a Young's modulus, at least in one direction, of at least 700 kg/mm$^2$, wherein the Young's modulus in the direction at right angles to the direction having a Young's modulus of at least 700 kg/mm$^2$ is at least 500 kg/mm$^2$, and wherein the polyester film has a thermosetting temperature of 220° to 240° C.

15. The biaxially oriented polyester film of claim 14, wherein the polyethylene-2,6-naphthalenedicarboxylate has an intrinsic viscosity in the range of 0.45 to 0.90.

16. The biaxially oriented polyester film of claim 14, wherein the Young's modulus at least in one direction is at least 800 kg/mm$^2$.

* * * * *